US008093990B2

(12) United States Patent
Rofougaran et al.

(10) Patent No.: US 8,093,990 B2
(45) Date of Patent: Jan. 10, 2012

(54) FAR FIELD RFID READER WITH BLOCKING

(75) Inventors: Ahmadreza (Reza) Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 966 days.

(21) Appl. No.: 12/048,815

(22) Filed: Mar. 14, 2008

(65) Prior Publication Data

US 2008/0238626 A1 Oct. 2, 2008

Related U.S. Application Data

(60) Provisional application No. 60/921,221, filed on Mar. 30, 2007, provisional application No. 60/932,411, filed on May 31, 2007.

(51) Int. Cl.
*H04Q 5/22* (2006.01)
*H04B 1/38* (2006.01)
*H04M 1/00* (2006.01)
*H04B 1/40* (2006.01)
*H04B 7/00* (2006.01)
*H04L 5/16* (2006.01)
*G06F 17/10* (2006.01)
*G08B 13/14* (2006.01)
*G05B 19/00* (2006.01)
*G08B 26/00* (2006.01)

(52) U.S. Cl. ............... 340/10.3; 340/10.1; 340/572.4; 340/5.61; 340/505; 340/568.1; 455/73; 455/556.1; 455/76; 455/561; 455/70; 708/300; 375/219

(58) Field of Classification Search ............... 340/572.1, 340/572.4, 572.7, 572.8, 573.1, 573.2, 568.1, 340/505, 521, 551, 10.1, 825.54, 825.49, 340/568, 500; 455/63.1, 263, 212, 265, 208, 455/132, 195.1, 260, 70, 67.14, 67.15, 556.2, 455/557, 168.1, 334, 352; 375/267, 326, 375/344, 347, 350, 318, 340, 323
See application file for complete search history.

(56) References Cited

U.S. PATENT DOCUMENTS

| | | | | |
|---|---|---|---|---|
| 7,013,165 B2* | 3/2006 | Yoon et al. | ............... | 455/561 |
| 7,092,674 B2* | 8/2006 | Pan | ............... | 455/73 |
| 7,155,172 B2* | 12/2006 | Scott | ............... | 455/70 |
| 7,224,722 B2* | 5/2007 | Shi et al. | ............... | 375/219 |
| 7,233,774 B2* | 6/2007 | Behzad | ............... | 455/76 |
| 7,587,224 B2* | 9/2009 | Zolfaghari | ............... | 455/556.1 |
| 2006/0035595 A1* | 2/2006 | Shi | ............... | 455/73 |
| 2007/0027943 A1* | 2/2007 | Jensen et al. | ............... | 708/300 |
| 2007/0058703 A1* | 3/2007 | Behzad et al. | ............... | 375/219 |
| 2008/0024278 A1* | 1/2008 | Volpi et al. | ............... | 340/10.1 |

* cited by examiner

*Primary Examiner* — Brian Zimmerman
*Assistant Examiner* — Mirza Alam
(74) *Attorney, Agent, or Firm* — Garlick Harrison & Markinson; Jessica W. Smith (57) ABSTRACT

A far field radio frequency identification (RFID) reader includes a baseband processing module, a transmitter section, and a receiver section. The receiver section includes a low noise amplifier module, a down conversion module, and a current mode blocking circuit. The low noise amplifier module amplifies an inbound RF signal to produce an amplified inbound RF signal. The down conversion module converts the amplified inbound RF signal into the inbound baseband signal. The current mode blocking circuit substantial compensates for a blocking current component of the baseband inbound signal and passes, substantially unattenuated, a signal current component of the baseband inbound signal.

17 Claims, 8 Drawing Sheets

FAR FIELD RFID READER WITH BLOCKING

This patent application is claiming priority under 35 USC §119 to a provisionally filed patent application entitled RFID SYSTEM, having a provisional filing date of Mar. 30, 2007, and a provisional Ser. No. of 60/921,221; and to a provisionally filed patent application entitled RFID SYSTEM, having a provisional filing date of May 31, 2007, and a provisional Ser. No. of 60/932,411.

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader also generates an unmodulated, continuous wave (CW) signal to activate and power the tag during data transfer.

RFID systems typically employ either far-field technology, in which the distance between the reader and the tag is great compared to the wavelength of the carrier signal, or near-field technology, in which the operating distance is less than one wavelength of the carrier signal, to facilitate communication between the RFID reader and RFID tag. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

Currently, RFID readers are formed of separate and discrete components whose interfaces are well-defined. For example, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field). However, the high cost of such discrete-component RFID readers has been a deterrent to widespread deployment of RFID systems. In addition, there are a number of different RFID standards, each defining a different protocol for enabling communication between the reader and the tag. Discrete RFID reader designs inhibit multi-standard capabilities in the reader.

Therefore, a need exists for a highly integrated low-cost far field RFID reader.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
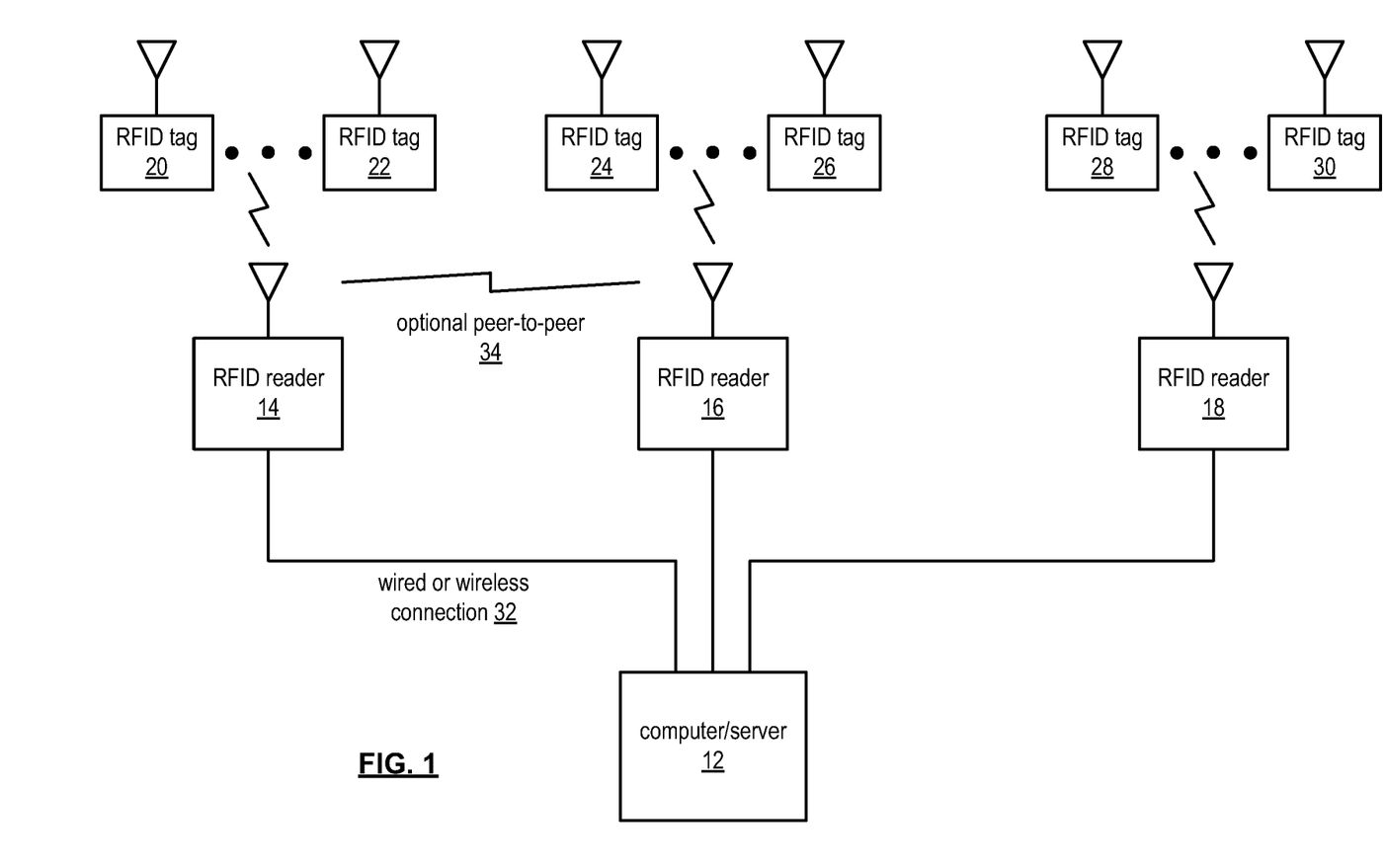
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In one embodiment, the RF communication scheme between the RFID readers 14-18 and RFID tags 20-30 is a backscatter technique whereby the RFID readers 14-18 request data from the RFID tags 20-30 via an RF signal, and the RF tags 20-30 respond with the requested data by modulating and backscattering the RF signal provided by the RFID readers 14-18. In another embodiment, the RF communication scheme between the RFID readers 14-18 and RFID tags 20-30 is an inductance technique whereby the RFID readers 14-18 magnetically couple to the RFID tags 20-30 via an RF signal to access the data on the RFID tags 20-30. In either embodiment, the RFID tags 20-30 provide the requested data to the RFID readers 14-18 on the same RF carrier frequency as the RF signal.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

The RFID system of FIG. 1 may be expanded to include a multitude of RFID readers 14-18 distributed throughout a desired location (for example, a building, office site, et cetera) where the RFID tags may be associated with equipment, inventory, personnel, et cetera. In addition, the computer/server 12 may be coupled to another server and/or network connection to provide wide area network coverage.

Figure 2:
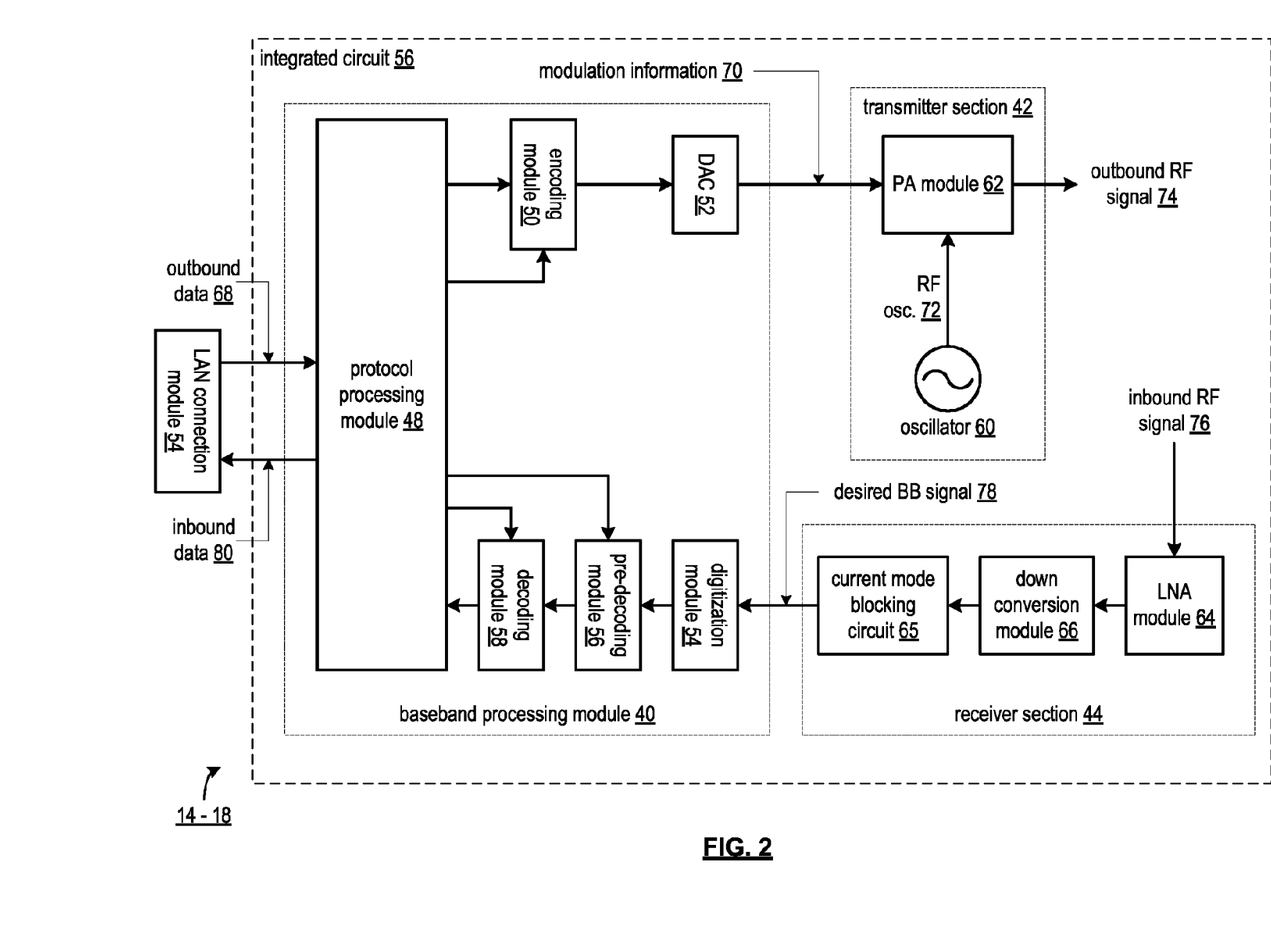
FIG. 2 is a schematic block diagram of an embodiment of an RFID reader in accordance with the present invention.

FIG. 2 is a schematic block diagram of an RFID reader 14-18 that includes an integrated circuit 56 and may further include a host interface module 54. The integrated circuit 56 includes a baseband processing module 40, a transmitter section 42, and a receiver section 44. Note that the host interface module 54 may include a communication interface to a host device, such as a USB dongle, compact flash or PCMCIA.

The baseband processing module 40 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 40 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 40 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-6.

As shown, the baseband processing module 40 may include a protocol processing module 48, an encoding module 50, a digital-to-analog converter (DAC) 52, a digitization module 54, a predecoding module 56 and a decoding module 58. The transmitter section 42 includes a power amplifier module 62 and an oscillator 60. The receiver section 44 includes a low noise amplifier (LNA) module 64, a down conversion module 66, and a current mode blocking circuit 65.

The protocol processing module 48 is coupled to prepare data for encoding in accordance with a particular RFID standardized protocol. In an embodiment, the protocol processing module 48 is programmed with multiple RFID standardized protocols to enable the RFID reader 14-18 to communicate with RFID tags, regardless of the particular protocol associated with the tag. The protocol processing module 48 operates to program filters and other components of the encoding module 50, decoding module 58, and pre-decoding module 56 in accordance with the particular RFID standardized protocol of the tag(s) currently communicating with the RFID reader 14-18.

In operation, once the particular RFID standardized protocol has been selected for communication with one or more RFID tags, the protocol processing module 48 generates and provides digital data to be communicated to the RFID tag to the encoding module 50 for encoding into modulation data. By way of example, but not limitation, the RFID protocols may include one or more line encoding schemes, such as Manchester encoding, FM0 encoding, FM1 encoding, etc. The DAC 52 converts the digital modulation data into analog modulation information 70, which is provided to the power amplifier module 62.

The power amplifier module 62, which includes one or more power amplifiers coupled in series and/or parallel and/or one or more power amplifier drivers coupled in series and/or parallel, amplifies an RF oscillation 72 based on the modulation information 70 to produce an outbound RF signal 74. The modulation information 70 may be amplitude modulation data such as amplitude modulation (AM) or amplitude shift keying (ASK), phase modulation data such as phase shift keying (PSK), and/or frequency modulation data such as frequency modulation, minimum shift keying (MSK), or frequency shift keying (FSK). As shown, the oscillation module 60, which may be a phase locked loop, crystal oscillator, etc. generates the RF oscillation 72. Note that the RF oscillation may have a frequency within one of a plurality of frequency bands (e.g., 900 MHz, 2.4 GHz, 5 GHz, 56-63 GHz, etc.).

The LNA module 64, which includes one or more low noise amplifiers coupled in series and/or parallel and/or one or more transconductance low noise amplifiers, receives an inbound RF signal 76. The inbound RF signal 76 may have a carrier frequency substantially the same as, or similar to (e.g., within a few percent), the carrier frequency of the outbound RF signal 74. The LNA module 64 amplifies the inbound RF signal to produce an amplified inbound RF signal. The down conversion module 66 converts the amplified inbound RF signal into an encoded inbound baseband signal 78. In an embodiment, the down conversion module 66 includes one or more mixers, filters, and/or gain stages to convert the inbound RF signal, which may have an in-phase component and a quadrature component, into the encoding inbound baseband signal 78.

Figure 3:
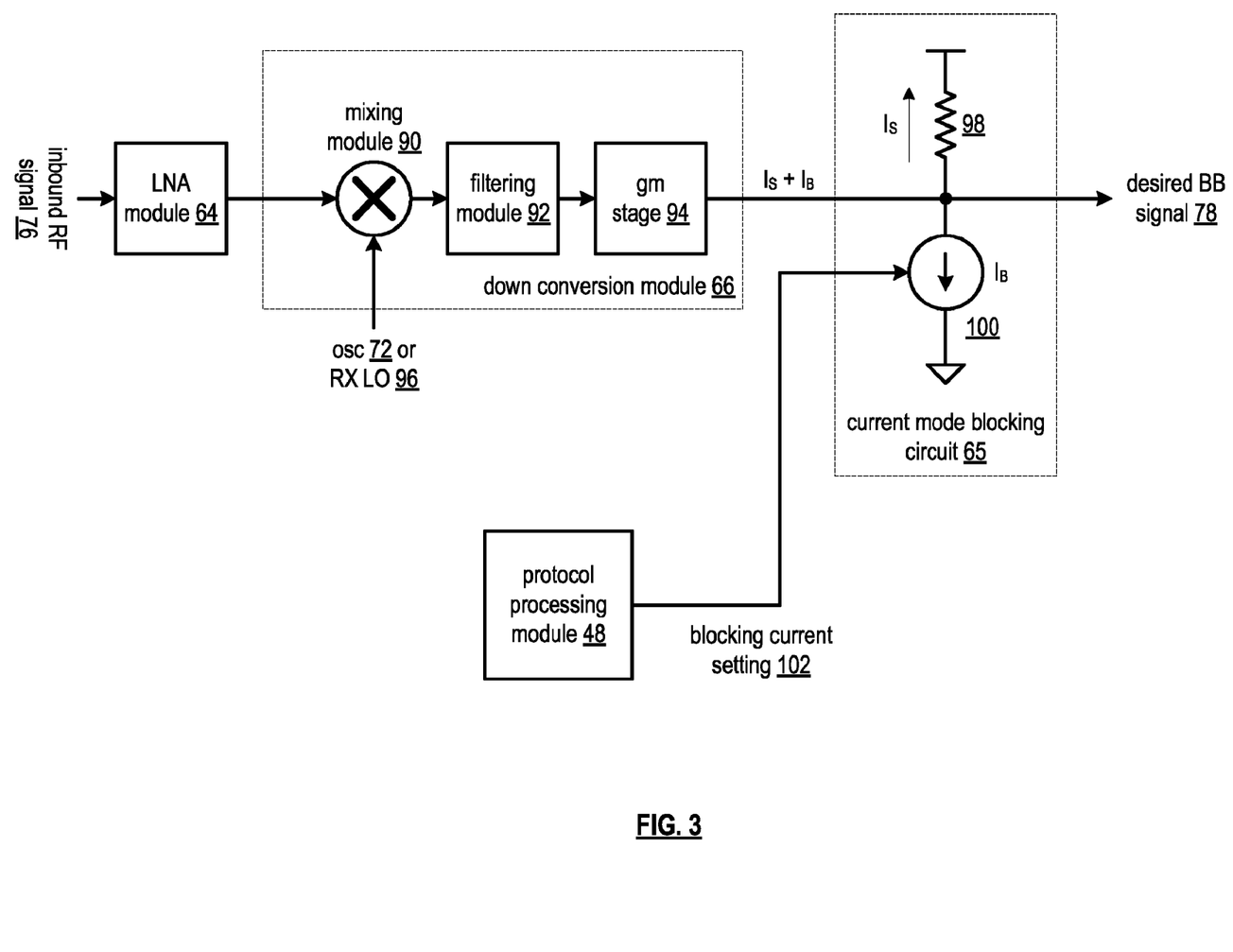
FIG. 3 is a schematic block diagram of an embodiment of a receiver section in accordance with the present invention.

The current mode blocking circuit 65 (an embodiment of which is shown in FIG. 3) substantial compensates for a blocking current component of the baseband inbound signal and to pass, substantially unattenuated, a desired signal current component of the baseband inbound signal as the desired baseband signal 78. In this manner, the desired signal current component, or a voltage representation thereof, is provided to the digitization module 54.

The digitization module 54, which may be a limiting module or an analog-to-digital converter, converts the desired baseband signal 78 into a digital signal. The predecoding module 56 converts the digital signal into a biphase encoded signal in accordance with the particular RFID protocol being utilized. The biphase encoded data is provided to the decoding module 58, which recaptures data therefrom in accordance with the particular encoding scheme of the selected RFID protocol. The protocol processing module 48 processes the recovered data to identify the object(s) associated with the RFID tag(s) and/or provides the recovered inbound data 80 to the server and/or computer for further processing.

FIG. 3 is a schematic block diagram of an embodiment of a receiver section 44 that includes the LNA module 64, the down conversion module 66, and the current module blocking circuit 65. The down conversion module 66 includes a mixing module 90, a filtering module 92, and a transconductance (gm) stage 94. The current mode blocking module 65 includes an impedance 98 and a current source 100.

In operation, the LNA module 64 amplifies the inbound RF signal 76 to produce an amplified inbound RF signal. The mixing module 90, which may include one or more mixers, mixes the amplified inbound RF signal with the RF oscillation 72 or with a receiver local oscillation 96 to produce a mixed signal. When the inbound RF signal 76 has substantially the same carrier frequency as the outbound RF signal 74, the mixing module 90 uses the RF oscillation 72. When the inbound RF signal 76 has a similar carrier frequency as the outbound RF signal 74 (e.g., within a few percent), the mixing module 90 uses the receiver local oscillation 96. Note that the receiver local oscillation 96 may be generated by the oscillator 60 or by another oscillator.

The filtering module 92 (which may include one or more low pass filters, bandpass filters, and may further include one or more gain stages) filters the mixed signal to produce the inbound baseband signal that has a carrier frequency of approximately zero Hertz and includes an in-phase component and a quadrature component. Alternatively, the inbound baseband signal may have an intermediate carrier frequency of a few Mega-Hertz, or less. The transconductance stage 94, which may include one or more transconductance unity gain amplifiers, converts the inbound baseband signal into an inbound baseband current signal ($I_S+I_B$) that includes the blocking current component ($I_B$) and the desired signal current component ($I_S$).

The controlled current source 100 generates a reference current ($I_B$) that corresponds to the blocking current component. In an embodiment, the baseband processing module 40 determines a blocking current setting 102 based on the outbound RF signal 74 and provides the blocking current setting 102 to the controlled current source 100. For example, the baseband processing module 40 determines the transmit power of the outbound RF signal 74 and utilizes the transmit power to determine the power level of the blocking component The impedance 98, which may be a resistor, biased transistor, etc., is coupled in series with the controlled current source 100. The common node of the impedance 98 and current source 100 receives a current representation of the inbound baseband signal ($I_S+I_B$). With the current source 100 sinking the reference current (IB), which substantially equals the blocking current, the current through the impedance 98 is the desired signal current component ($I_S$). Accordingly, a voltage across the impedance 98 is a voltage representation of the desired baseband signal 78. Note that if the inbound baseband signal includes an in-phase component and a quadrature component, the current mode blocking circuit 65 may include a second current source and a second impedance, where the first current source-impedance is used for the in-phase component and the second current source-impedance is used for the quadrature component.

In an alternate embodiment, the LNA module 64 includes a transconductance amplifier and the transconductance stage 94 of the down conversion module 66 is omitted. In this instance, the mixing module 90 and the filtering module 92 are current mode devices.

Figure 4:
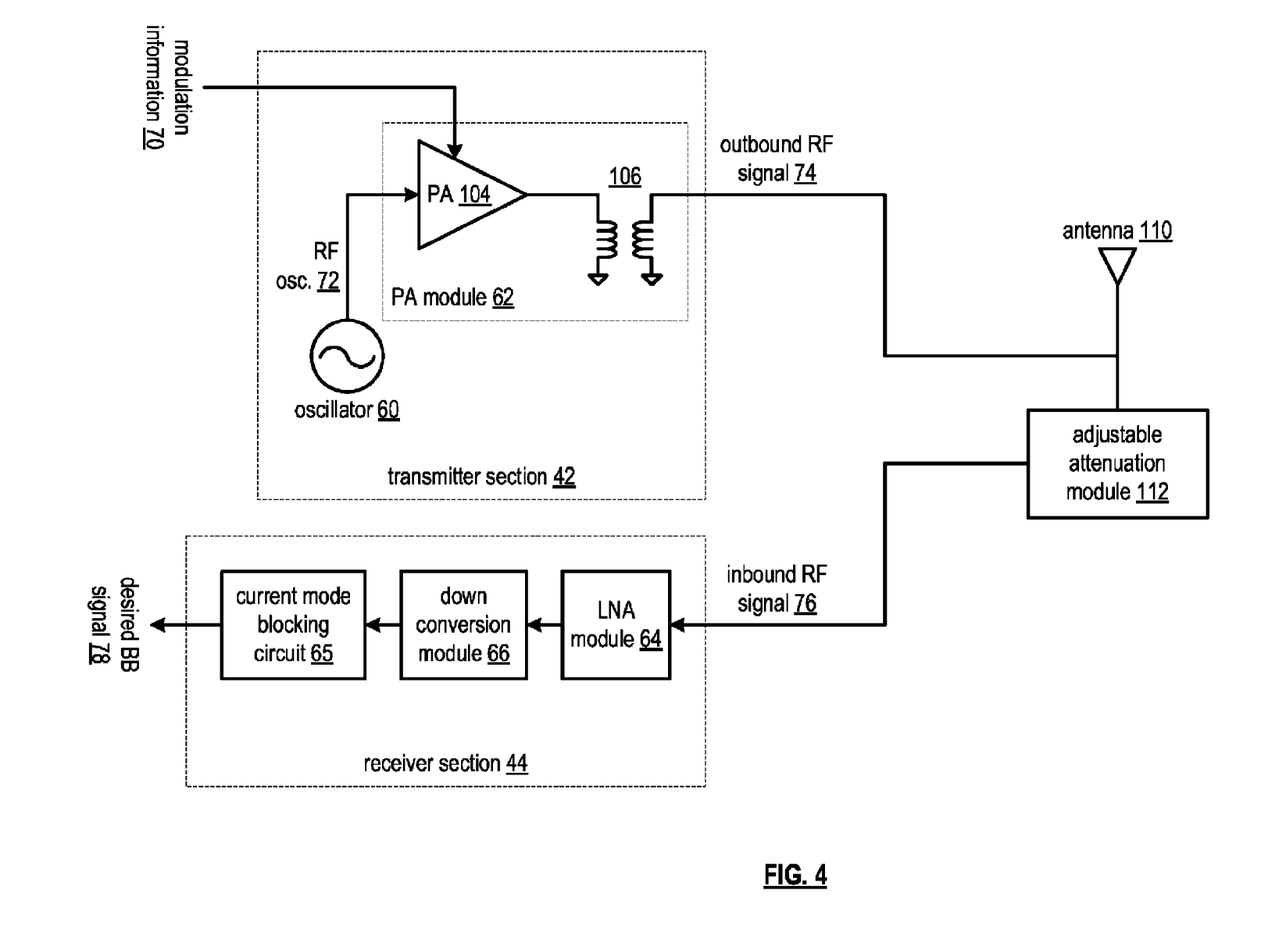
FIG. 4 is a schematic block diagram of an embodiment of a receiver section and a transmitter section in accordance with the present invention.

FIG. 4 is a schematic block diagram of an embodiment of a receiver section 44 and a transmitter section 42 coupled to an adjustable attenuation module 112 and an antenna 110. The transmitter section 42 includes the oscillator 60 and the power amplifier module 62, which includes one or more power amplifiers and/or power amplifier drivers 104 and a transformer 106. The receiver section 44 includes the LNA module 64, the down conversion module 66, and the current mode blocking module 65, which function as previously discussed.

The antenna 110, which may include one or more monopole or dipole antennas, is coupled to the transmitter section 42 and to the adjustable attenuation module 112. In this manner, the outbound RF signal 74 is transmitted via the antenna 110 and the inbound RF signal is provided to the adjustable attenuation module 112. The adjustable attenuation module 112 may include an adjustable low pass filter, an adjustable notch filter, an adjustable bandpass filter, or an adjustable gain stage to reduce the signal strength of the inbound RF signal 76, which includes the blocking signal component and the desired signal component. By reducing the signal strength of the inbound RF signal 76, the LNA module 64 operates in a more optimal manner (e.g., more linear) thereby improving the sensitivity of receiver section 44 to detect the desired signal component.

In this figure, the power amplifier module 62 includes a power amplifier 104 and a transformer 106. The power amplifier 104 amplifies and modulates the RF oscillation 72 in accordance with the outbound modulation information 70 to produce an amplified and modulated RF signal. The transformer 106, which may be an on-chip or off-chip transformer balun, electromagnetically produces the outbound RF signal 74 from the amplified and modulated RF signal. In an embodiment, the transformer 106 includes a turns ratio of M such that the voltage of the outbound RF signal 74 is greater than the voltage of the amplified and modulated RF signal.

Figure 5:
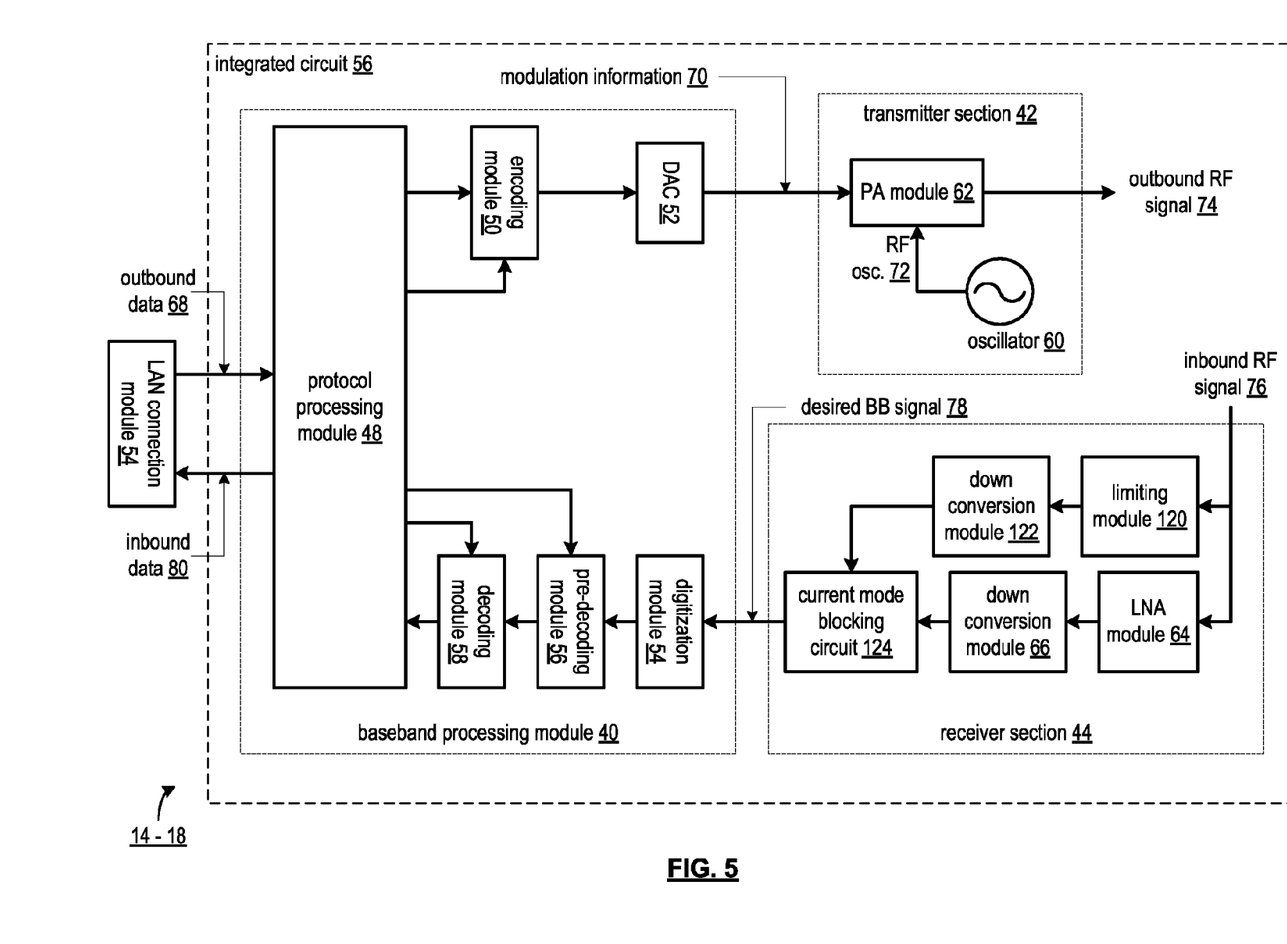
FIG. 5 is a schematic block diagram of another embodiment of an RFID reader in accordance with the present invention.

FIG. 5 is a schematic block diagram of another embodiment of an RFID reader 14-18 that includes the baseband processing module 40, the transmitter section 42, and the receiver section 44. The receiver section 44 includes the LNA module 64, the down conversion module 66, a limiting module 120, a second down conversion module 122, and a current module blocking circuit 124. The baseband processing module 40 and the transmitter section 42 include components and function as previously described. Note that the RFID reader of FIG. 5 may further include an adjustable attenuation module 112 as shown in FIG. 4.

In operation, the low noise amplifier module 64 amplifies an inbound RF signal 76 to produce an amplified inbound RF signal. The first down conversion module 66 converts the amplified inbound RF signal into the inbound baseband signal, which includes the desired signal component and the blocking signal component. The limiting module 120 limits the inbound RF signal to produce a limited inbound RF signal. The limited inbound RFID signal includes a substantially attenuated desired signal component and a substantially unattenuated blocking signal component. In an embodiment, the limiting module 120 includes a limiter that limits the inbound RF signal 76, which is amplitude modulated, to a constant envelope signal. The limiting module 120 may further include a scaling module such that the blocking signal component of the limited inbound signal has a substantially similar magnitude of the received blocking signal component of the inbound RF signal.

The second down conversion module 122, which may have a similar construct to that of the first down conversion module 66, converts the limited inbound RF signal into a limited inbound baseband signal. The current mode blocking circuit 124 (an embodiment of which will be described with reference to FIG. 6) is coupled to substantial compensate for a blocking current component of the baseband inbound signal and to pass, substantially unattenuated, a desired signal current component of the baseband inbound signal based on a current representation of the limited inbound baseband signal. The desired signal current component is representative of the inbound baseband signal 78.

Figure 6:
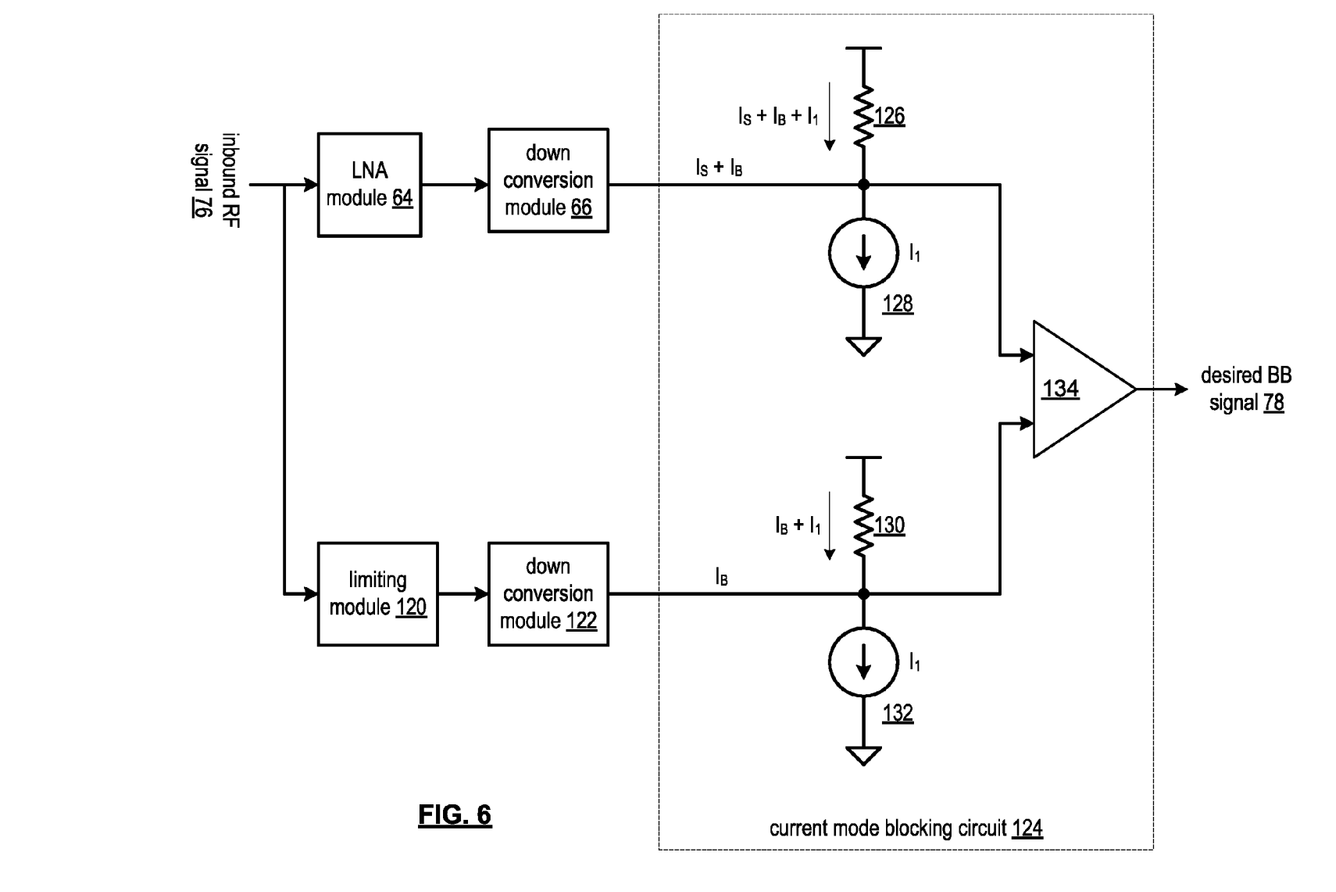
FIG. 6 is a schematic block diagram of another embodiment of a receiver section in accordance with the present invention.

FIG. 6 is a schematic block diagram of another embodiment of a receiver section 44 that includes the LNA module 64, the down conversion module 66, the current module blocking circuit 124, the limiting module 120, and the down conversion module 122. The current mode blocking circuit 124 includes a first impedance 126, a first current source 128, a second impedance 130, and a second current source 132.

In operation, the LNA module 64, which may be a transconductance low noise amplifier, amplifies the inbound RF signal 76 to produce an inbound RF current. The first down conversion module 66 converts the inbound RF current signal into an inbound baseband current signal (e.g., $I_S+I_B$), which includes the blocking current component and the desired signal current component. The limiting module 120, which may include a limiter and a transconductance stage, limits the inbound RF signal to produce a limited RF signal (e.g., $I_B$) and the transconductance stage produces a limited inbound RF current signal. The second down conversion module 122 converts the limited inbound RF current signal into a current representation of the limited inbound baseband signal.

Within the current module blocking circuit 124, the first and second current sources 128 and 132 generate a reference current (e.g., $I_1$). The first impedance 126, which may be a resistor, biased transistor, switched capacitor circuit, etc., is coupled in series with the first current source 128 to produce a first series circuit. The first series circuit receives a current representation of the inbound baseband signal ($I_S+I_B$) at the common node such that the current through impedance 126 is $I_S+I_B+I_1$.

The second impedance 130, which may be a resistor, biased transistor, switched capacitor circuit, etc., is coupled in series with the second controlled current source 132 to produce a second series circuit. The second series circuit receives the current representation of the limited inbound baseband signal ($I_B$) at the common node such that the current through the second impedance is $I_B+I_1$. A current corresponding to the inbound baseband signal 78 is the different between the current through the first impedance and the second impedance (e.g., $[I_S+I_B+I_1]-[I_B+I_1]=I_S$).

The current mode blocking circuit 124 may further include an amplifier 134, which includes a first input, a second input, and an output. As shown, the first input is coupled to the first common node and the second input is coupled to the second common node such that the output provides a desired voltage signal (e.g., the inbound baseband signal 78).

In an alternate embodiment, the LNA module 64 provides a voltage signal as the amplified inbound RF signal and the limiting module 120 provides a voltage signal as the limited inbound RF signal. In this instance, the first down conversion module includes a mixing module, a filtering module, and a transconductance stage. The first mixing module mixes the amplified inbound RF signal with the RF oscillation or with a receiver local oscillation to produce a first mixed signal. The first filtering module filters the first mixed signal to produce the inbound baseband signal. The first transconductance stage converts the inbound baseband signal into an inbound baseband current signal that includes the blocking current component and the desired signal current component.

The second down conversion module includes a mixing module, a filtering module, and a transconductance stage. The second mixing module mixes the limited inbound RF signal with the RF oscillation or with the receiver local oscillation to produce a second mixed signal. The second filtering module filters the second mixed signal to produce the limited inbound baseband signal. The first transconductance stage converts the limited inbound baseband signal into the current representation of the limited inbound baseband signal.

Figure 7:
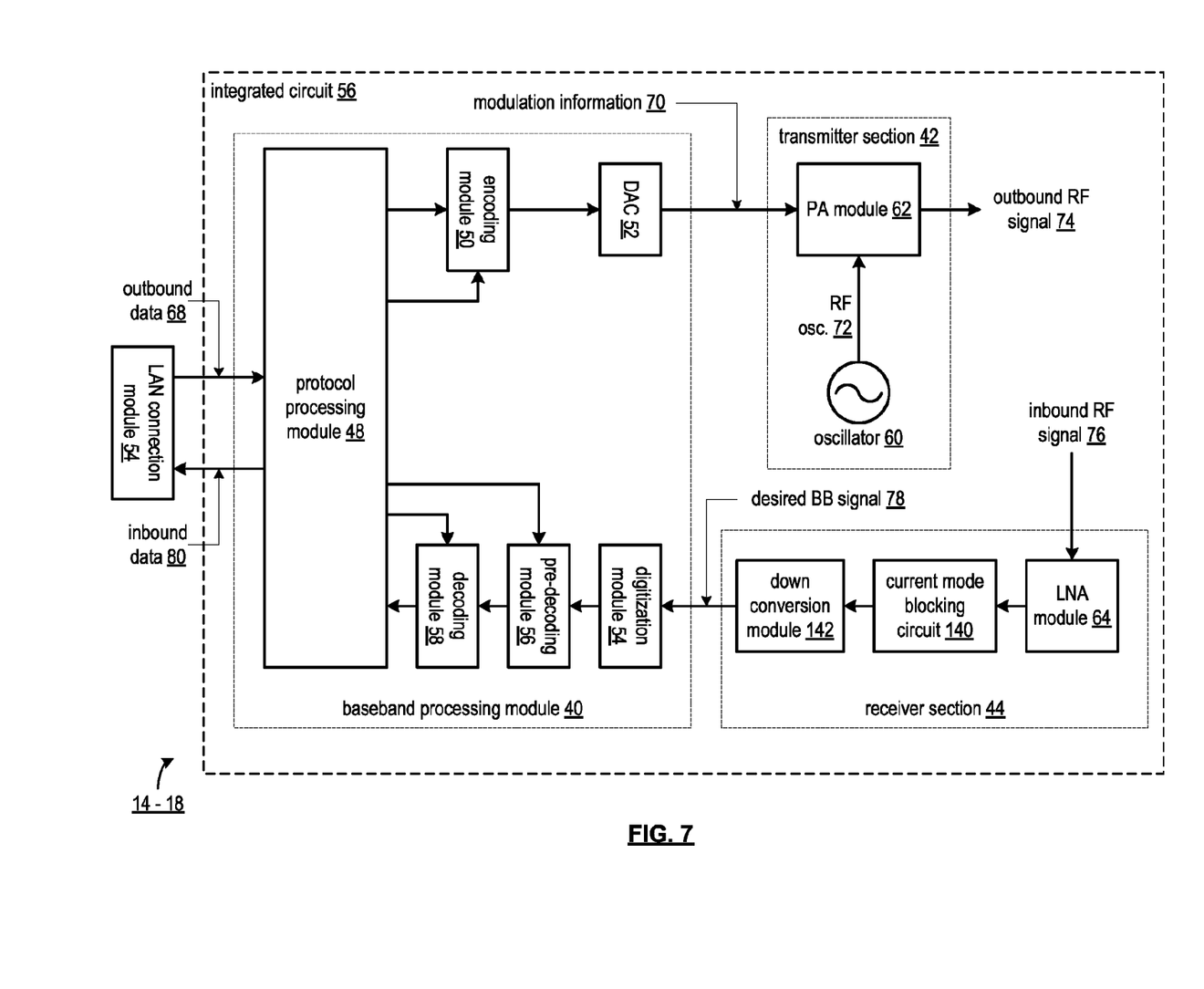
FIG. 7 is a schematic block diagram of another embodiment of an RFID reader in accordance with the present invention.

FIG. 7 is a schematic block diagram of another embodiment of an RFID reader 14-18 that includes the baseband processing module 40, the transmitter section 42, and the receiver section 44. The receiver section 44 includes the LNA module 64, a current mode blocking circuit 140, and the down conversion module 142. The baseband processing module 40 and the transmitter section 42 include components and function as previously described. Note that the RFID reader of FIG. 7 may further include an adjustable attenuation module 112 as shown in FIG. 4.

In operation, the LNA module 64 is a transconductance low noise amplifier module that amplifies the inbound RF signal 76 to produce an amplified inbound RF current signal. The current mode blocking circuit 140 (an embodiment of which will be described with reference to FIG. 8) substantial compensates for a blocking current component of the amplified inbound RF current signal and passes, substantially unattenuated, a signal current component of the amplified inbound RF current signal. The down conversion module 142 140 (an embodiment of which will be described with reference to FIG. 8) converts the signal current component into the desired inbound signal (e.g., inbound baseband signal 78).

Figure 8:
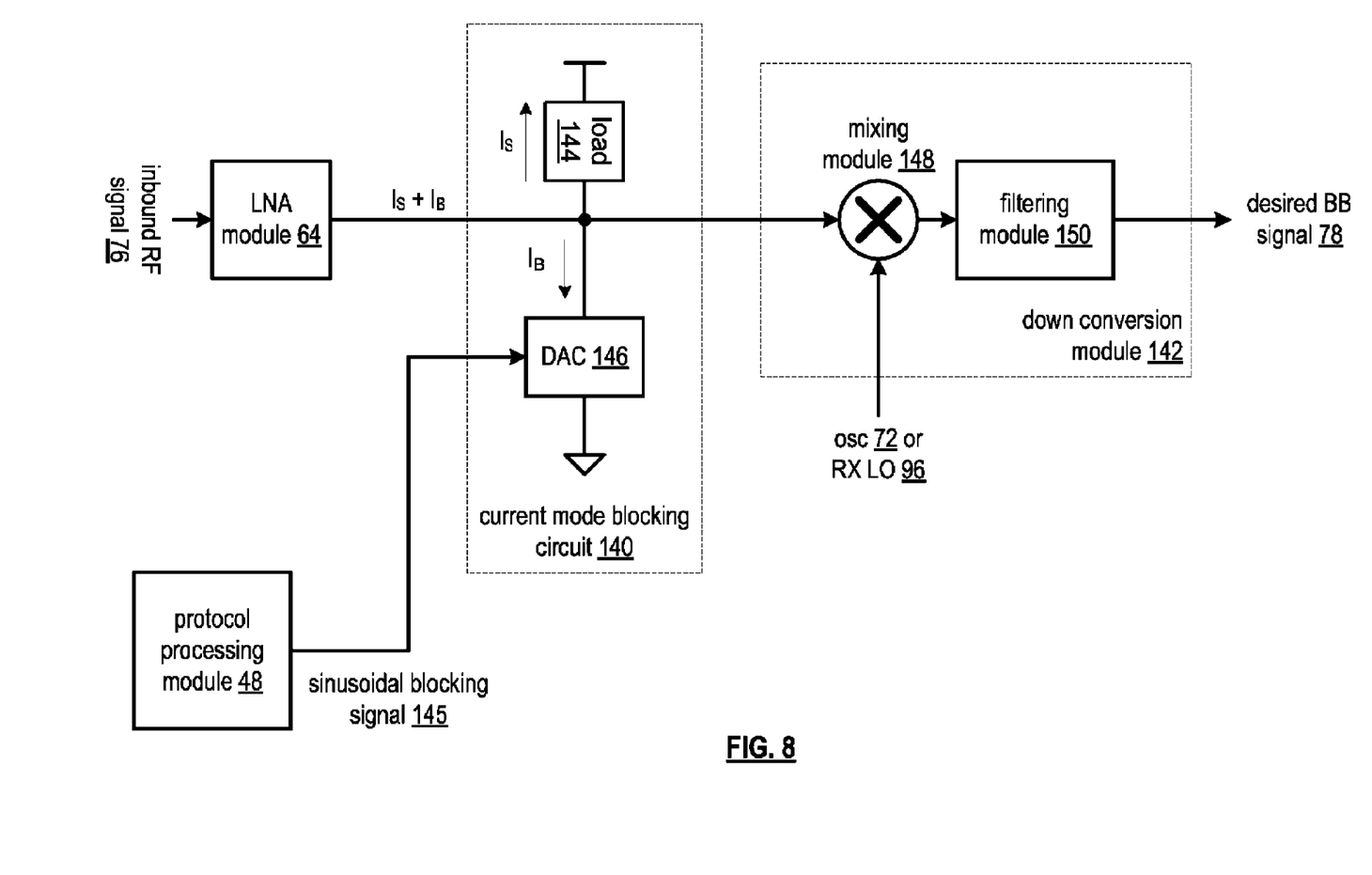
FIG. 8 is a schematic block diagram of another embodiment of a receiver section in accordance with the present invention.

FIG. 8 is a schematic block diagram of another embodiment of a receiver section 42 that include the LNA module 64, the current mode blocking circuit 140, and the down conversion module 142. The current module blocking circuit 140 includes a load 144 and a controlled digital to analog converter (DAC) 146. The down conversion module includes a transconductance mode mixer 148 and a filtering module 150.

In operation, the LNA module 64 is a transconductance low noise amplifier module that amplifies the inbound RF signal 76 to produce an amplified inbound RF current signal ($I_S+I_B$).

The blocking circuit 140 receives the amplified inbound RF current signal at a common node of the DAC 146 and the load 144, which may be an inductor-capacitor tank circuit, a resistor, a transistor, etc. The DAC 144 generates a reference current ($I_B$) corresponding to the blocking current component. The current through the load 144 corresponds to the desired RF current signal.

In an embodiment, the baseband processing module 40 generates a sinusoidal blocking signal 145 based on the outbound RF signal 74 and provides it to the controlled DAC 146. For example, the baseband processing module 40 may include a direct digital frequency synthesis (DDFS) to generate a sinusoidal signal that has an amplitude and phase that corresponds to the outbound RF signal 74.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A far field radio frequency identification (RFID) reader comprises:
    a baseband processing module coupled to:
       convert outbound data into outbound modulation information; and
       convert an inbound baseband signal into inbound data;
    a transmitter section that includes:
       an oscillation module coupled to generate a radio frequency (RF) oscillation; and
       a power amplifier module coupled to amplify and to modulate the RF oscillation based on the modulation information to produce an outbound RF signal; and
    a receiver section that includes:
       a low noise amplifier module coupled to amplify an inbound RF signal to produce an amplified inbound RF signal;
       a down conversion module coupled to convert the amplified inbound RF signal into the inbound baseband signal; and
       a current mode blocking circuit coupled to substantially compensate for a blocking current component of the baseband inbound signal and to pass, substantially unattenuated, a desired signal current component of the baseband inbound signal.

2. The far field RFID reader of claim 1, wherein the low noise amplifier module comprises:
    a transconductance low noise amplifier coupled to amplify the inbound RF signal to produce an inbound RF current, wherein the down conversion module converts the inbound RF current signal into an inbound baseband current signal, wherein the inbound baseband current signal includes the blocking current component and the desired signal current component.

3. The far field RFID reader of claim 1, wherein the down conversion module comprises:
    a mixing module coupled to mix the amplified inbound RF signal with the RF oscillation or with a receiver local oscillation to produce a mixed signal;
    a filtering module coupled to filter the mixed signal to produce the inbound baseband signal; and
    a transconductance stage coupled to convert the inbound baseband signal into an inbound baseband current signal that includes the blocking current component and the desired signal current component.

4. The far field RFID reader of claim 1 further comprises:
    an adjustable attenuation module coupled to attenuate the outbound RF signal to produce an attenuated outbound RF signal, wherein the low noise amplifier module receives the attenuated outbound RF signal.

5. The far field RFID reader of claim 1, wherein the current mode blocking circuit comprises:
    a controlled current source that generates a reference current corresponding to the blocking current component; and an impedance coupled in series with the controlled current source to produce a series circuit, wherein a common node of the series circuit receives a current representation of the inbound baseband signal, and wherein a voltage across the impedance represents a desired baseband signal.

6. The far field RFID reader of claim 5, wherein the baseband processing module further functions to:
determines a blocking current setting based on the outbound RF signal; and
provides the blocking current setting to the controlled current source such that the controlled current source generates the reference current corresponding to the blocking current component.

7. The far field RFID reader of claim 1, wherein the power amplifier module comprises:
a power amplifier coupled to amplify and to modulate the RF oscillation in accordance with the outbound modulation information to produce an amplified and modulated RF signal; and
a transformer coupled to electromagnetically produce the outbound RF signal from the amplified and modulated RF signal.

8. A far field radio frequency identification (RFID) reader comprises:
a baseband processing module coupled to:
convert outbound data into outbound modulation information; and
convert an inbound baseband signal into inbound data;
a transmitter section that includes:
an oscillation module coupled to generate a radio frequency (RF) oscillation; and
a power amplifier module coupled to amplify and to modulate the RF oscillation based on the modulation information to produce an outbound RF signal; and
a receiver section that includes:
a low noise amplifier module coupled to amplify an inbound RF signal to produce an amplified inbound RF signal;
a limiting module coupled to limit the inbound RF signal to produce a limited inbound RF signal;
a first down conversion module coupled to convert the amplified inbound RF signal into the inbound baseband signal;
a second down conversion module coupled to convert the limited inbound RF signal into a limited inbound baseband signal; and
a current mode blocking circuit coupled to substantially compensate for a blocking current component of the baseband inbound signal and to pass, substantially unattenuated, a desired signal current component of the baseband inbound signal based on a current representation of the limited inbound baseband signal.

9. The far field RFID reader of claim 8, wherein the current mode blocking circuit comprises:
a first current source that generates a reference current;
a first impedance coupled in series with the first current source to produce a first series circuit, wherein a first common node of the first series circuit receives a current representation of the inbound baseband signal;
a second current source that generates the reference current;
a second impedance coupled in series with the second controlled current source to produce a second series circuit, wherein a second common node of the second series circuit receives the current representation of the limited inbound baseband signal, wherein a different between the first common node and the second common node represents a desired baseband signal.

10. The far field RFID reader of claim 9, wherein the current mode blocking circuit further comprises:
an amplifier having a first input, a second input, and an output, wherein the first input is coupled to the first common node and the second input is coupled to the second common node, where the output provides a desired voltage signal.

11. The far field RFID reader of claim 8 further comprises:
the low noise amplifier module including a transconductance low noise amplifier coupled to amplify the inbound RF signal to produce an inbound RF current, wherein the first down conversion module converts the inbound RF current signal into an inbound baseband current signal, wherein the inbound baseband current signal includes the blocking current component and the desired signal current component; and
the limiting module including a limiter and a transconductance stage, wherein the limiter limits the inbound RF signal to produce a limited RF signal and the transconductance stage produces the limited inbound RF signal in a current mode from the limited RF signal to produce a limited inbound RF current signal, wherein the second down conversion module converts the limited inbound RF current signal into the a current representation of the limited inbound baseband signal.

12. The far field RFID reader of claim 8 further comprises:
the first down conversion module including:
a first mixing module coupled to mix the amplified inbound RF signal with the RF oscillation or with a receiver local oscillation to produce a first mixed signal;
a first filtering module coupled to filter the first mixed signal to produce the inbound baseband signal; and
a first transconductance stage coupled to convert the inbound baseband signal into an inbound baseband current signal that includes the blocking current component and the desired signal current component; and
the second down conversion module including:
a second mixing module coupled to mix the limited inbound RF signal with the RF oscillation or with the receiver local oscillation to produce a second mixed signal;
a second filtering module coupled to filter the second mixed signal to produce the limited inbound baseband signal; and
a first transconductance stage coupled to convert the limited inbound baseband signal into the current representation of the limited inbound baseband signal.

13. The far field RFID reader of claim 8 further comprises:
an adjustable attenuation module coupled to attenuate the outbound RF signal to produce an attenuated outbound RF signal, wherein the low noise amplifier module and the limiting module receive the attenuated outbound RF signal.

14. A far field radio frequency identification (RFID) reader comprises:
a baseband processing module coupled to:
convert outbound data into outbound modulation information; and
convert an inbound baseband signal into inbound data;
a transmitter section that includes:
an oscillation module coupled to generate a radio frequency (RF) oscillation; and a power amplifier module coupled to amplify and to modulate the RF oscillation based on the modulation information to produce an outbound RF signal; and a receiver section that includes:

a transconductance low noise amplifier module coupled to amplify an inbound RF signal to produce an amplified inbound RF current signal;

a current mode blocking circuit coupled to substantially compensate for a blocking current component of the amplified inbound RF current signal and to pass, substantially unattenuated, a signal current component of the amplified inbound RF current signal; and a down conversion module coupled to convert the signal current component into the desired inbound signal.

15. The far field RFID reader of claim 14, wherein the current mode blocking circuit comprises:

a controlled digital to analog converter that generates a reference current corresponding to the blocking current component; and a load coupled in series with the controlled digital to analog converter to produce a series circuit, wherein a common node of the series circuit receives the amplified inbound RF current signal, and wherein a current through the load represents a desired RF current signal.

16. The far field RFID reader of claim 15, wherein the baseband processing module further functions to:

generates a sinusoidal blocking signal based on the outbound RF signal; and provides the sinusoidal blocking signal to the controlled digital to analog converter such that the controlled digital to analog converter generates the reference current corresponding to the blocking current component.

17. The far field RFID reader of claim 14, wherein the power amplifier module comprises:

a power amplifier coupled to amplify and to modulate the RF oscillation in accordance with the outbound modulation information to produce an amplified and modulated RF signal; and a transformer coupled to electromagnetically produce the outbound RF signal from the amplified and modulated RF signal.

* * * * *

UNITED STATES PATENT AND TRADEMARK OFFICE
CERTIFICATE OF CORRECTION

PATENT NO.       : 8,093,990 B2  
APPLICATION NO.  : 12/048815  
DATED            : January 10, 2012  
INVENTOR(S)      : Ahmadreza Rofougaran et al.

It is certified that error appears in the above-identified patent and that said Letters Patent is hereby corrected as shown below:

Col. 11, line 67, in claim 9: replace "wherein a different" with --wherein a difference--

Signed and Sealed this  
Nineteenth Day of March, 2013

Teresa Stanek Rea  
*Acting Director of the United States Patent and Trademark Office*